June 13, 1967   E. W. ADAMS   3,324,610
VEHICLE CUPOLA STRUCTURE
Filed Dec. 16, 1965   2 Sheets-Sheet 1

INVENTOR.
EDWARD W. ADAMS
BY
*Oldham & Oldham*
ATTORNEYS

June 13, 1967  E. W. ADAMS  3,324,610
VEHICLE CUPOLA STRUCTURE
Filed Dec. 16, 1965  2 Sheets-Sheet 2

INVENTOR.
EDWARD W. ADAMS
BY
Oldham & Oldham
ATTORNEYS

United States Patent Office 3,324,610
Patented June 13, 1967

3,324,610
VEHICLE CUPOLA STRUCTURE
Edward W. Adams, 10027 Baltic Ave.,
Cleveland, Ohio 44102
Filed Dec. 16, 1965, Ser. No. 514,320
8 Claims. (Cl. 52—72)

The present invention relates to vehicle cupola structures, and especially to extensible top means particularly adapted for use on vehicles to increase the head space in the vehicle, when desired.

This is a continuation-in-part of my prior application Ser. No. 462,813, filed June 10, 1965, now abandoned.

Heretofore there have been various efforts made to provide different vehicles, such as trucks, trailers and other types of vehicles wherein some type of a vertically movable or adjustable roof structure has been built in the vehicle so that the load carrying capacity of the vehicle may be changed, or so that the actions of loading and unloading the vehicle are facilitated. Also, in so-called house or home trailers, efforts have been made heretofore to provide a cupola structure therefor which can be vertically elevated at desired times to increase the head room in the vehicle for living or other purposes. One of such prior constructions is shown in Patent No. 2,926,042.

The general object of the present invention is to provide a novel and improved cupola structure for a vehicle, such as a house trailer, and which cupola is characterized by its novel construction and by use of power means for readily and automatically raising and/or lowering the cupola structure, as desired.

Another object of the invention is to use substantially conventional members, such as electric motors, flexible drive shafts, and driven control rods in a vehicle for elevating a cupola structure automatically to a fully raised operative position.

Other objects of the invention will be made apparent as the specification proceeds and in general such other objects include the provision of a relatively inexpensive, sturdy, collapsible cupola for house trailers and the like.

Reference now is particularly made to the accompanying drawings, wherein.

When referring to corresponding members shown in the drawings and referred to in the specification, corresponding numerals are used to facilitate comparison therebetween.

Figure 1:
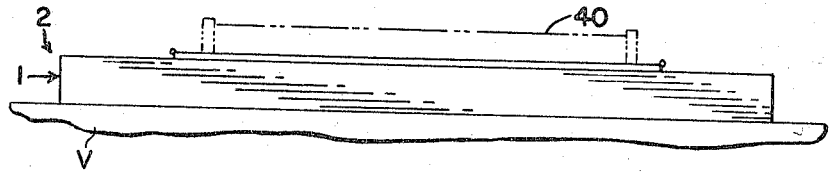
FIGURE 1 is a side elevation of the cupola structure of the invention, when in its inoperative or lowered form, and attached by a suitable base structure to a vehicle.
Figure 2:
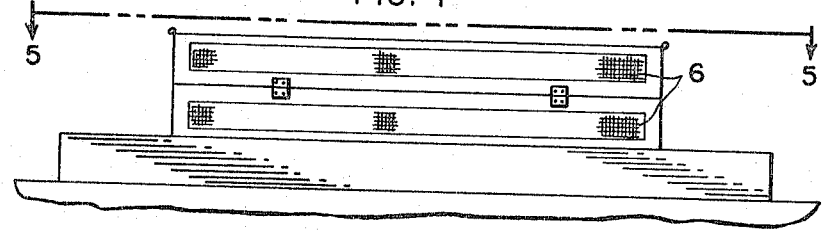
FIGURE 2 is a side elevation like FIGURE 1, but with the cupola being raised to its operative position.
Figure 3:
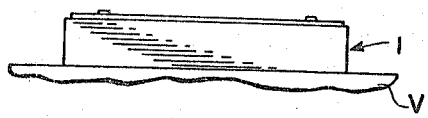
FIGURE 3 is an end elevation of the lowered cupola of FIGURE 1.
Figure 4:
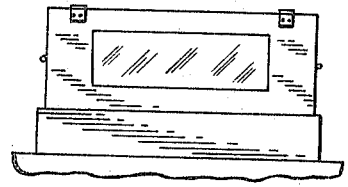
FIGURE 4 is an end elevation, like FIGURE 3, but with the cupola raised.
Figure 5:
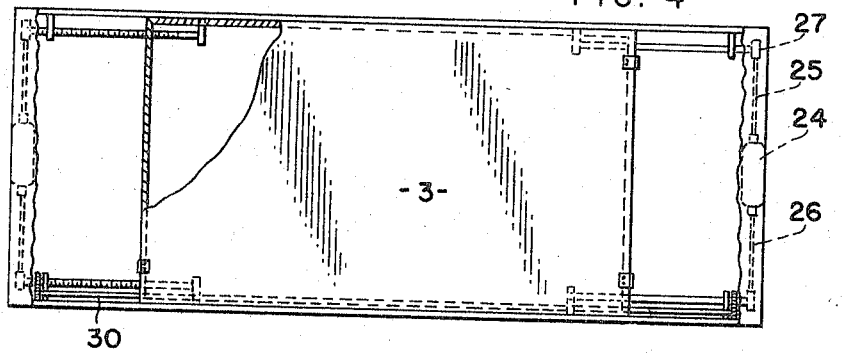
FIGURE 5 is a plan view of the structure of FIGURE 2, with some parts being broken away for clarity and with some parts being shown in horizontal section.

Generally speaking, the present invention relates to a power operated retractible vehicle cupola structure that may be built separately and be secured to a vehicle, and/or built initially as an integral part of the vehicle and where the cupola structure comprises a top, a pair of sides, means pivotally securing the sides to the top at opposed lateral margins thereof, a pair of ends, means pivotally securing the ends individually to opposed ends of the top, control members one of which is secured to each of the ends adjacent the lower margin thereof and normally extends therebelow, a driven control device for each of the control members and individually engaged therewith, and drive means engaging the control devices to actuate them to move the ends, and thus the sides and top to raised operative positions and for retracting them to lowered, inoperative positions.

Attention now is particularly directed to the details of the structure shown in the drawings, and a suitable open centered frame 1 is shown which frame 1 may be separate from a vehicle V for attachment in any suitable manner to a top around an opening therein, or it may be formed as an integral top portion of a vehicle, as desired. In all events, the invention particularly relates to a cupola structure indicated as a whole by the numeral 2, which cupola is adapted to be secured to, and form part of, the top of a vehicle and to be raised to operative position for providing increased head room or space within the vehicle and for being retracted to a lowered inoperative position, such as for transport of the vehicle.

Figure 6:
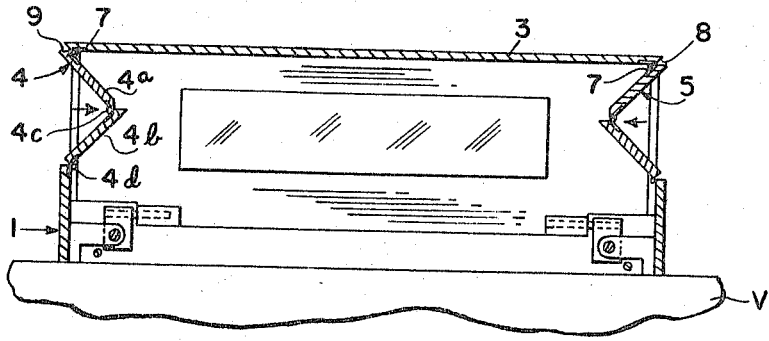
FIGURE 6 is a fragmentary broken away vertical section of the cupola of FIGURE 1 as it is being raised.

The cupola primarily comprises a top 3 that normally is of rectangular shape and usually is made from a substantially solid or rigid material. A pair of sides 4 and 5 are present in the cupola and these sides usually are of rectangular shape. Each of the sides 4 and 5 is made of two longitudinally extending pieces as the sections 4a and 4b, FIGURE 6, that are hinged together at 4c along their adjacent edges and are hingedly secured to an upper edge of the frame 1 and 4d. Screens 6, or the like, may be provided in portions of these sides, as desired. The sides 4 and 5 are pivotally secured to the top 3, as by means of hinges 7, FIGURE 6, where the hinges engage with the inner adjacent surfaces of the top 3 and the sides so that the sides normally are dependent from the top and will move therewith. Adjacent edges of the top and side, as shown in FIGURE 6, and as indicated at 8 and 9, respectively, are usually beveled at complementary angles, such as about 45°, for engagement therebetween when the sides 4 and 5 are to be in vertical operative positions and the top 3 is to be horizontal, although other angular relationships may be obtained therebetween, if desired. The movement of the sides 4 and 5 is controlled by the forces applied to the top 3 to raise or lower the cupola.

Figures 7, 8:
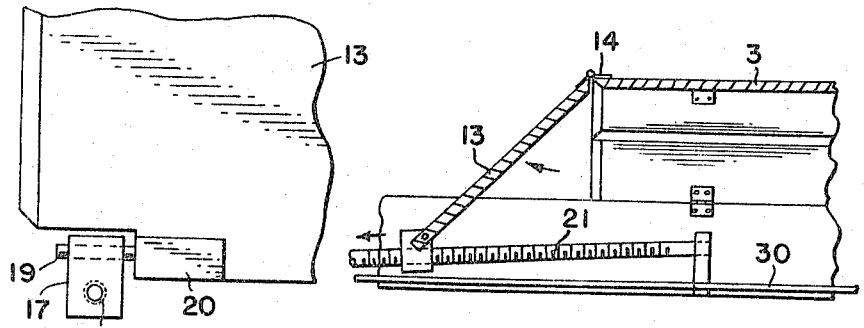
FIGURE 7 is a fragmentary enlarged elevation of a portion of an end of the cupola to show the position control means associated therewith.
FIGURE 8 is a fragmentary detail, shown in vertical section of the means used for raising and lowering the cupola.
Figure 9:
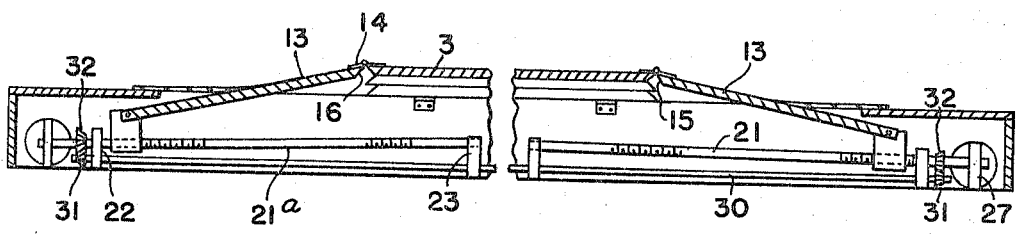
FIGURE 9 is a longitudinal vertical section, partially broken away, of the cupola of FIGURE 1 in inoperative position.

The cupola 2 is completed by a pair of ends 13 which are individually secured to end portions of the top 3 by means, such as hinges 14, secured to the adjacent outer edge surfaces of the ends 13 and top 3, as shown in FIGURE 8, for example. Again, corresponding edges of the top 3 and ends 13, as indicated at 15 and 16, respectively, in FIGURE 9, are usualy beveled at angles complementary to each other whereby the ends 13, for example, would be normally vertically positioned to engage snugly with the top 3 when it is in its elevated horizontal position. The ends 13 are of a length substantially equal to the width of the top 3.

It is an important feature of the present invention that suitable control members are provided for controlling the positions of the ends 13 of the cupola and thus, by the pivotal connection of the ends to the top, and the sides 4 and 5 to the top, the position of all portions of the cupola 2 can be controlled through the control members that determine the positions of the ends 13, 13 of the cupola. Such control members are shown, in this instance in FIGURE 7 and in FIGURE 8, as comprising a control lug 17, each of which has a threaded aperture 18 formed therein in the embodiment of the invention disclosed. Such control lug 17 is pivotally secured to each of the ends 13 usually adjacent each lateral margin thereof, as by a support pin or shaft 19 that is in turn suitably secured to or carried by the ends 13, as by a support block or member 20 which is suitably attached to each of the ends 13 at the lateral lower margins thereof.

The actual positions of the ends 13 are controlled by driven control devices or means that engage these control lugs 17. In this instance, threaded control rods or shafts 21 are positioned, for example, on the frame 1, by a pair of bearings 22 and 23 that engage and journal spaced portions of the control rods 21 therein for rotation, as hereinafter described. The control rods threadably engage the apertures 18 of the control lugs whereby rotation of the control rods will vary the positions of the ends and thus of the entire cupola structure by moving the lower ends of the cupola ends 13 longitudinally of the cupola. FIGURE 8 shows these ends being lowered to control the positioning of the cupola whereas FIGURE 9 shows the substantially completely retracted position of the ends 13.

Drive is transmitted to the control rods 21 from conventional members that are suitably secured to the frame 1 of the cupola, or to any other desired portion of the vehicle. Such drive means, for example, comprise 12 volt electric motors 24, one of which is positioned adjacent each end of the cupola 2, normally. Each electric motor then in turn drives two flexible shafts 25 and 26, or equivalent members, that extend transversely of the cupola adjacent each end thereof. The flexible shafts 25 and 26 in turn connect to suitable gear nuts, speed reducers, or equivalent means 27 which engage the rods 21 whereby the shafts 25 and 26 are coupled to and engage, individually, the control rods 21 for driving such control rods through the speed reducers 27 to transmit required power to the control rods 21 and effect the operative position of the cupola 2. The electric motors 24 have any suitable or conventional control means connected thereto whereby the operator of the vehicle can merely close a control switch and the electric motors will be actuated from a conventional power source.

To aid in obtaining smooth action in the raising and lowering action of the cupola, usually it is desirable to synchronize, or couple the drive of the electric motors 24 so that a stabilizer rod 30 is shown suitably journalled on the frame 1, or other portion of the vehicle, at longitudinally spaced portions of the stabilizer rod. This stabilizer rod 30 in turn is provided with any suitable means, such as a bevel gear 31, adjacent each end thereof, which gears 31 are engaged with corresponding bevel gears 32 carried by one of the control rods 21 at each end of the cupola. Thus, drive action between the two control rods coupled together by the stabilizer rod 30 are synchronized and caused to move as a unit whereby the components of the cupola are insured to be moved to and from operative positions in unison. Also, drive is transmitted from one end of the cupola to the other by the stabilizer rod 30. If a second motor is not used in the apparatus, the fourth control rod 21 would be unthreaded to slip through the associated control member 17 as the end 13 is moved by the one driven control rod 21a.

It will be realized that any suitable power means can be used for moving the lower ends of the ends 13 of the cupola in an axial direction and this provides the power actuated control means to raise and lower the cupola. Any suitable means may connect the ends to the drive means. Also, the vertically extending edges of the ends preferably are beveled complementary to the adjacent vertically extending edges of the sides to form tight joints therebetween when operatively positioned.

When desired, any suitable types of rubber insulation or gasket means can be provided adjacent the edges of the cupola that are to be abutted when the cupola is operatively positioned whereby sealed connections can be formed therebetween. Water-tight hinge means preferably are used in the novel cupolas. Likewise, any desired cover and/or seal members, or units can be provided between or over adjacent portions of the vehicle and/or frame 1 and the movable components of the cupola 2 to seal these members in relationship to each other when the cupola is in inoperative condition. Such seal means may be flexible and be secured to and extend between the frame 1 and each of the ends 13.

It should be noted, as another feature of the invention, normally these guide or control rods 21, FIGURE 9, are downwardly inclined with relation to the frame 1 or to the vehicle in a direction extending longitudinally outwardly of the cupola 2. Hence, as the lower edges of the ends of the cupola are raised and moved longitudinally of the control rods, not only is the full height of the ends realized by the lifting or raising action, but also the upward inclination of the control rods aids materially in providing several additional inches of height in the top of the cupola when elevated. The actual angle of inclination can be varied as desired and it may be a larger angle than shown. By such angular positioning of the ends, they can be moved to inoperative positions parallel with the control rods 21.

A baggage rack 40 may be carried by the top 3.

From the foregoing, it is believed that it will be seen that a novel and improved cupola structure has been provided, that any suitable screens or windows may be provided in the components of the cupola, and that the objects of the invention have been achieved.

While one complete embodiment of the invention has been disclosed herein, it will be appreciated that modification of this particular embodiment of the invention may be resorted to without departing from the scope of the invention as defined in the appended claims.

What is claimed is:

1. A power operated collapsible cupola for a vehicle and comprising
    a quadrilateral top,
    a pair of rectangular sides of the same length as said top and hingedly secured to the side edges thereof, each of said sides formed from two longitudinally extending pieces hinged together along their adjacent edges so that said sides break inwardly under said top when said top is lowered,
    a pair of ends of about the same width as said top and hingedly secured thereto at the ends thereof, said ends and sides being of the same height,
    a control member pivotally secured to each of said ends at the lower end thereof, said control members each having a tapped aperture therein,
    a threaded control rod for each of said control members and each engaging one of said apertures in one of each control members, and
    drive means engaging said control rods for rotating them to move said ends, sides, and top to raised operative positions and for retracting them to lowered inoperative positions.

2. A power operated collapsible cupola for a vehicle as in claim 1 wherein
    said drive means includes electric motor drive means, and
    flexible shaft and speed reducer means connecting said drive means to said control means.

3. A cupola as in claim 1 where said sides have a retracted position folded under said top, and said ends are retracted to inoperative positions by axial outward movement.

4. A power operated collapsible cupola for a vehicle and comprising
    a quadrilateral top,
    a pair of rectangular sides hingedly secured to the side edges of said top, said sides folding inwardly under said top when said top is lowered, a pair of ends of about the same width as said top and hingedly secured thereto at the ends thereof, a control member pivotally secured to each of said ends, said control members each having a tapped aperture therein, a threaded control rod for each of said control members and each engaging one of said apertures in one of each control members, and drive means engaging said control rods for rotating them to move said ends, sides, and top.

5. A cupola as in claim 4 where said sides each comprise a pair of longitudinally extending sections hingedly secured together along adjacent edges thereof to form an upper and a lower side section and where the lower side section is hingedly secured to a support for the cupola.

6. A power operated collapsible cupola as in claim 5 where said control means are movable with relation to said ends, and said drive means are reversible.

7. A cupola as in claim 1 where said control rods are downwardly inclined with relation to the vehicle in a direction extending longitudinally outwardly of the cupola.

8. A power operated collapsible cupola for a vehicle and comprising a quadrilateral top, a pair of rectangular sides of the same length as said top and hingedly secured to the side edges thereof, each of said sides formed from two longitudinally extending pieces hinged together along their adjacent edges so that said sides break inwardly under said top when said top is lowered, a pair of ends of about the same width as said top and hingedly secured thereto at the ends thereof, said ends and sides being of the same height, a control member pivotally secured to each of said ends at the lower end thereof, a control rod for each of said control members, each control rod operatively engaging a control member and being downwardly inclined with relation to the vehicle in a direction extending longitudinally outwardly of the cupola, and drive means engaging said control rods for rotating them to move said ends, sides, and top to raised operative positions and for retracting them to lowered inoperative positions.

References Cited

UNITED STATES PATENTS

| 722,166 | 3/1903 | Taft | 296—27 X |
| 1,998,937 | 4/1935 | McGinnis | 296—26 X |
| 2,483,332 | 9/1949 | Brumbaugh | 296—27 X |
| 3,050,331 | 8/1962 | Mansen | 296—27 |
| 3,190,689 | 6/1965 | Calthorpe | 296—23 |

FOREIGN PATENTS 941,809  11/1963  Great Britain.

BENJAMIN HERSH, *Primary Examiner.*

C. C. PARSONS, *Assistant Examiner.*